United States Patent
Mihan et al.

(10) Patent No.: US 6,936,666 B2
(45) Date of Patent: Aug. 30, 2005

(54) CONTINUOUS GAS-PHASE POLYMERIZATION PROCESS

(75) Inventors: Shahram Mihan, Ludwigshafen (DE); Rainer Karer, Kaiserlautern (DE); Manfred Hecker, Neustadt Wied (DE); Philipp Rosendorfer, Neustadt Weinstrasse (DE); Kasper Evertz, Milan (IT); Armin Lange, Heidelberg (DE)

(73) Assignee: Babell Polyolfine GmbH, Wesseling (DE)

(*) Notice: Subject to any disclaimer, the term of this patent is extended or adjusted under 35 U.S.C. 154(b) by 0 days.

(21) Appl. No.: 10/486,395

(22) PCT Filed: Oct. 29, 2002

(86) PCT No.: PCT/EP02/12047

§ 371 (c)(1),
(2), (4) Date: Feb. 11, 2004

(87) PCT Pub. No.: WO03/042253

PCT Pub. Date: May 22, 2003

(65) Prior Publication Data

US 2004/0236040 A1 Nov. 25, 2004

(30) Foreign Application Priority Data

Nov. 15, 2001 (DE) .......................................... 101 56 202

(51) Int. Cl.⁷ .................................................. C08F 2/34
(52) U.S. Cl. ............................. 526/68; 526/70; 526/83; 526/84; 526/85; 526/82; 526/901; 526/348; 526/351; 526/352
(58) Field of Search .............................. 526/68, 70, 83, 526/84, 85, 82, 901, 348, 351, 352

(56) References Cited

U.S. PATENT DOCUMENTS

| 5,625,012 A | 4/1997 | Hussein et al. |
| 6,180,729 B1 * | 1/2001 | Lange et al. .................. 526/74 |

FOREIGN PATENT DOCUMENTS

| EP | 089 691 | 9/1983 |
| EP | 301 872 | 2/1989 |
| EP | 359 444 | 3/1990 |
| EP | 376 559 | 7/1990 |
| EP | 471 497 | 2/1992 |
| EP | 475 603 | 3/1992 |
| EP | 571 826 | 12/1993 |
| EP | 927 724 | 7/1999 |
| WO | 98/20045 | 5/1998 |

OTHER PUBLICATIONS

XP–002233606, *Reaction Kills Systems* Aug. 2000.

* cited by examiner

*Primary Examiner*—William K. Cheung
(74) *Attorney, Agent, or Firm*—Novak Druce & Quigg

(57) ABSTRACT

Continuous gas-phase polymerization process for preparing ethylene and propene homopolymers and copolymers, in which ethylene, propene or mixtures comprising ethylene or propene and $C_3$–$C_8$-α-monoolefins are polymerized in the polymerization zone of a gas-phase polymerization reactor at from 30 to 125° C. and pressures of from 1 to 100 bar in the gas phase in a bed comprising finely divided polymer in the presence of a catalyst. To remove the heat of polymerization, the reactor gas is circulated and firstly passes through a cyclone after leaving the reactor. To prevent polymer deposits in the circulating gas system, a catalyst poison having a boiling point above the maximum temperature within the circulating gas system is fed into this circulating gas system at a position between the reactor and the cyclone.

9 Claims, No Drawings

CONTINUOUS GAS-PHASE POLYMERIZATION PROCESS

The present invention relates to a continuous gas-phase polymerization process for preparing ethylene and propene homopolymers and copolymers, in which ethylene, propene or mixtures comprising ethylene and propene and $C_3$–$C_8$-α-monoolefins are polymerized in the polymerization zone of a gas-phase polymerization reactor at from 30 to 125° C. and pressures of from 1 to 100 bar in the gas phase in a bed comprising finely divided polymer in the presence of a catalyst, with the reactor gas being circulated to remove the heat of polymerization and the circulated reactor gas being firstly passed through a cyclone after leaving the reactor.

Gas-phase polymerization processes are economical processes for the polymerization of ethylene and propene or for the copolymerization of ethylene or propene with $C_3$–$C_8$-α-oolefins. Such gas-phase polymerization processes can be carried out either as gas-phase fluidized-bed processes or as stirred gas-phase processes. Processes of this type are described, for example, in EP-A-0 475 603, EP-A-0 089 691 and EP-A-0 571 826.

A characteristic of gas-phase fluidized-bed processes is that the bed comprising polymerizing polymer particles is kept in the fluidized state by introduction of a gas mixture from below. This gas mixture also removes the heat of polymerization from the reactor. The reaction gas is cooled in a heat exchanger located outside the reactor and is recirculated back into the reactor through a gas distributor plate (circulating gas).

However, the circulating gas also entrains a certain amount of finely divided polymer and carries it from the reactor and into the circulating gas system. These polymer particles comprise active catalyst and can thus polymerize further in the circulating gas system. If these particles deposit in the circulating gas system, deposits and fouling can occur in these places. These deposits can, firstly, themselves lead to malfunctions (blockage of the cooler, conglutination in the compressor), but, secondly, parts of these deposits can become detached again. This is undesirable for two reasons. The detached deposits can quickly block the holes of the gas distributor plate of the reactor and thus necessitate shutdown and costly cleaning. If such pieces of deposit get through the gas distributor plate into the reactor, the product quality is adversely affected by these particles, with formation of specks. Particularly in the case of products for film applications, out-of-specification material can thus be obtained.

Attempts to solve this problem in the past have been directed particularly at reducing the proportion of fine polymer dust in the circulating gas. Many fluidized-bed plants therefore have a cyclone downstream of the reactor outlet to separate off this fine reactive dust (cf., for example, EP-A-0 301 872). Since, however, complete precipitation cannot be achieved by means of a cyclone, fine dust which still contains active catalyst can get into the circulating gas system despite the cyclone.

The use of catalyst poisons in gas-phase fluidized-bed polymerizations is already known. Thus, for example, catalyst poisons are used for stopping polymerizations (e.g. in the case of a polymerization reaction which has gone out of control, cf., for example, EP-A-0 471 497) or for fine regulation of the catalyst activity (cf., for example, EP-A-359 444 or EP-A-376 559). However, in continuous processes, use is usually made of volatile compounds, in general gases such as $CO_2$, CO or $O_2$, because their site of action is supposed to be mainly in the reactor and uniform distribution in the reactor volume is desirable. These agents are in general unsuitable for the targeted inactivation of catalyst-containing fine dusts in the circulating gas system, since they have a considerable influence on the polymerization reaction in the reactor.

EP-A-0 927 724 discloses a gas-phase polymerization process in which a catalyst poison having a boiling point above the maximum temperature within the circulating gas line is fed into this circulating gas line to prevent polymer deposits in the circulating gas line; it is introduced in at most such an amount that the productivity of the catalyst in the reactor is not significantly impaired thereby. The site of addition of the catalyst poison is not laid down precisely; it is merely stated that the addition occurs into the circulating gas line, preferably before the circulating gas stream passes through the cooler and the compressor. Although this process can lead to a reduction in deposit formation in the circulating gas line, the amount of catalyst poison introduced can be varied only within narrow limits since larger amounts of the catalyst poison would adversely affect the polymerization reaction.

It is an object of the present invention to find a way of preventing formation of polymer deposits in the circulating gas system of gas-phase polymerization plants which is simple in terms of apparatus, to increase the running time of such plants and to increase the quality of the polymerization products.

We have found that this object is achieved by a continuous gas-phase polymerization process for preparing ethylene and propene homopolymers and copolymers, in which ethylene, propene or mixtures comprising ethylene and propene and $C_3$–$C_8$-α-monoolefins are polymerized in the polymerization zone of a gas-phase polymerization reactor at from 30 to 125° C. and pressures of from 1 to 100 bar in the gas phase in a bed comprising finely divided polymer in the presence of a catalyst, with the reactor gas being circulated to remove the heat of polymerization and the circulated reactor gas being firstly passed through a cyclone after leaving the reactor, wherein a catalyst poison having a boiling point above the maximum temperature within the circulating gas system is fed into this circulating gas system at a position between the reactor and the cyclone to prevent polymer deposits in the circulating gas system.

The process of the present invention can be carried out in a gas-phase fluidized-bed reactor as is described in detail in, for example, EP-A-0 475 603, EP-A-0 089 691 or EP-A-0 571 826, or in a gas-phase stirred reactor. The information given below relates predominantly to gas-phase fluidized-bed processes, but can also be applied in an appropriate fashion to stirred gas-phase polymerization processes. In general, the gas-phase fluidized-bed reactor is a tube of varying length through which circulated reactor gas flows. In general, the circulated reactor gas is fed in at the lower end of the gas-phase fluidized-bed reactor and is taken off again at its upper end. The circulated reactor gas is usually a mixture of ethylene or propene, if desired together with a molecular weight regulator such as hydrogen and inert gases such as nitrogen and/or saturated hydrocarbons such as ethane, butane or hexane. The reactor gas can further comprise $C_3$–$C_8$-α-monoolefins such as propene, 1-butene, 1-pentene, 2-methylpentene, 1-hexene, 1-heptene and 1-octene as comonomers. Preference is given to a process in which ethylene is copolymerized with 1-hexene. The velocity of the reactor gas has to be sufficiently high to fluidize the mixed bed of finely divided polymer located in the tube and serving as polymerization zone and also to remove the heat of polymerization effectively.

To achieve constant reaction conditions, the constituents of the reactor gas can be fed directly into the gas-phase fluidized-bed reactor or can be fed in via the circulated reactor gas. In the process of the present invention, it is advantageous to introduce the catalyst directly into the fluidized bed. It is particularly advantageous to introduce the catalyst a little at a time together with nitrogen or argon directly into the particle bed.

To prevent finely divided polymer being carried from the polymerization zone into the circulating gas system, the gas-phase fluidized-bed reactor used for the process of the present invention preferably has a calming zone with an increased diameter at its upper end so as to reduce the circulating gas velocity. In general, it is advisable to reduce the circulating gas velocity in this calming zone to from one third to one sixth of the circulating gas velocity in the polymerization zone.

The circulated reactor gas is firstly passed through a cyclone after it leaves the reactor. According to the present invention, the high-boiling catalyst poison is added to the circulating gas before it passes through the cyclone. The liquid catalyst poison thus has the opportunity of wetting the highly catalytically active fine dust particles. These wetted fine dust particles are then removed from the circulating gas in the cyclone. This process step makes it possible to remove not only the fine dust but also the catalyst poison from the circulating gas or at least to achieve a significant reduction in its concentration in the circulating gas. As a result, less catalyst poison reaches the reactor where it can have an adverse effect on the polymerization reaction. Alternatively, it is possible in this way to add larger amounts of the catalyst poison so as to achieve more effective deactivation of the polymerization-active fine dust particles. In addition, fine dust which is not precipitated in the cyclone is also wetted by the catalyst poison, as a result of which undesirable polymerization and deposit formation in the circulating gas system is avoided.

After passage through the cyclone, the circulating gas is passed to a circulating gas compressor and a circulating gas cooler; these equipment items may be present in either order. The cooled and compressed circulating gas is then generally introduced back into the well-mixed particle bed of the gas-phase fluidized-bed reactor via a customary and known gas distributor plate. This results in very homogeneous gas distribution which ensures good mixing of the particle bed.

As in other gas-phase fluidized-bed polymerizations, the ratios of the starting materials, in particular the ratio of ethylene to $C_3$–$C_8$-α-monoolefins, in the process of the present invention influence the density of the resulting copolymers. Furthermore, the amount of catalyst introduced determines the product output of the gas-phase fluidized-bed reactor. Its capacity is, as is known, limited by the cooling capacity of the circulated reactor gas. This cooling capacity depends firstly on the pressure of the reactor gas or the pressure at which the (co)polymerization is carried out. It is generally advisable to employ pressures of from 1 to 100 bar, preferably from 10 to 80 bar and in particular from 15 to 50 bar. Secondly, the cooling capacity depends on the temperature at which the (co)polymerization in the fluidized bed is carried out. In the process of the present invention, it is advantageous to employ temperatures of from 30 to 125° C., particularly preferably from 70 to 115° C. To obtain copolymers of relatively high density, preference is given to temperatures in the upper part of this range, while temperatures in the lower part of this range are preferably set for copolymers of relatively low density.

Apart from the temperature, the proportion of inert gases such as nitrogen or hydrocarbons also has an influence on the risk of conglutination and deposits occurring. High proportions of inert gas can reduce the risk of deposits, but they can also reduce the space-time yield so that the process can become uneconomic. In the process of the present invention, the proportion of inert gas is preferably from 25 to 55% by volume, particularly preferably from 35 to 50% by volume, based on the total volume of the reaction gas.

As catalysts, it is possible to use all known catalysts as are customarily used for ethylene and propene (co) polymerization, i.e., for example, Ziegler-Natta catalysts, chromium catalysts or metallocene catalysts. These catalysts together with necessary or advantageous cocatalysts and activators are known to those skilled in the art. These catalysts are generally used in supported form, for example on support materials such as inorganic oxides (e.g. MgO or silica gel) or organic polymers (e.g. polyethylene particles). However, the catalysts can also be fed into the reactor in unsupported form.

Catalyst poisons which can be used according to the present invention are all compounds which have a boiling point above the maximum temperature within the circulating gas system. The catalyst poisons can be of quite different chemical character. It is important that, firstly, they have a low vapor pressure at the temperatures prevailing in the circulating gas system. Secondly, these catalyst poisons have to bear functional groups which coordinate more strongly than ethylene to the active centers of the catalyst metal atoms and thus inhibit the catalyst highly irreversibly. The first requirement, i.e. the low vapor pressure, depends particularly on the molecular weight, so that, for example, oligomeric and polymeric materials having suitable functional groups display good effectiveness. Well-suited catalyst poisons for the purposes of the present invention generally have a molecular weight of above 100, preferably above 150 and particularly preferably above 200.

Preference is given to using catalyst poisons which have a vapor pressure at 20° C. of less than 10 000 Pa, particularly preferably less than 2000 Pa and very particularly preferably less than 1000 Pa.

As regards the second requirement, namely the suitable functional groups, preference is given to a process in which the catalyst poison introduced is a compound or mixture of compounds containing at least one of the functional groups —$NR_2$, —NR—, —OR, —O—, =O, —OS, —S— and =S, where R is hydrogen or an alkyl radical having from 1 to 8 carbon atoms. Particularly useful compounds are ones which bear a plurality of such functional groups, with these groups being able to be identical or different.

The radical R is preferably hydrogen, but can also be an alkyl radical such as methyl, ethyl, propyl, isopropyl and butyl or one of the various $C_5$–$C_8$-alkyl radicals, with methyl and ethyl being preferred.

In the process of the present invention, particular preference is given to using catalyst poisons which contain a hydroxyethylamino group, in particular ones having a di(hydroxyethyl)amino group. Particular mention may be made of, for example, the commercially available alkylamino ethoxylate Atmer 163 (manufactured by Uniqema, marketed by Ciba Spezialitatenchemie Lambertheim GmbH, Germany).

The amount of catalyst poison to be introduced cannot be stated generally, but depends on the catalyst poison, on the catalyst or cocatalyst system, on the formation of fine dust and on the reaction conditions. The optimum amount has to be determined experimentally. This is advantageously done by gradually increasing the amount of catalyst poison until an influence on the catalyst productivity becomes discernible and then reducing the amount a little. Since the precise amount of fine dust to be deactivated is not known, it is possible to meter the catalyst poison into the circulating gas line in an amount, based on the product output, of about 0.1–10 ppm, preferably about 0.5–3.0 ppm, particularly preferably about 0.5–1.0 ppm.

The catalyst poison can be introduced in pure form or, preferably, in diluted form, at best in dissolved form, into the circulating gas line. Addition of the catalyst poison together with a diluent as a fine aerosol via a spray nozzle into the circulating gas line is particularly effective. Possible diluents are all media which are compatible with the polymerization process. A process in which the catalyst poison is fed into the circulating gas line as a mixture with a $C_3$–$C_8$-α-monoolefin, preferably in dissolved form, has been found to be particularly advantageous. Of course, the monoolefin used is generally the respective comonomer. Addition in the form of a mixture or a solution in an inert hydrocarbon such as hexane is likewise advantageous. The concentration of the catalyst poison is then preferably from 0.1 to 1.0% by weight, based on the total amount of this mixture or this solution.

In one embodiment of the process of the present invention, the catalyst poison together with a surface-active compound are fed into the circulating gas line. As surface-active substances, it is possible to use, for example, fatty alcohol ethoxylates, polyalkylene glycols or ethylene oxide-propylene oxide block copolymers. Further suitable compounds are known to those skilled in the art. The surface-active substances increase the wettability of the fine dust by the catalyst poison liquid and thus improve the effectiveness of the catalyst poisons.

Other additives as are known to those skilled in the art can also be used in the polymerization process of the present invention. The use of additives which reduce the electrostatic charge on the polymer particles in the reactor has been found to be especially advantageous. The use of an antistatic such as Costelan AS 100 (manufacturer: H. Costenoble GmbH & Co KG, Germany) has been found to be particularly useful.

In a further advantageous embodiment of the process of the present invention, the mixture of fine dust and catalyst poison which has been separated off in the cyclone is added to the polymerization product. Thus, the fine dust which has been separated off is utilized in an economically useful way without an adverse effect on the polymer being observed. In this embodiment, the fine dust which has been separated off by means of the cyclone can be discharged from the cyclone with the aid of a pressure drop prevailing between the reactor and the product discharge vessel. This usually considerable pressure drop ensures effective emptying of the cyclone and additionally reduces deposit formation in the cyclone.

Gas-phase fluidized-bed reactors generally have a calming zone in the upper part of the reactor. Enlargement of the reactor diameter in the upper part of the reactor reduces the flow velocity of the fluidizing gas so that the polymer particles are no longer carried upward. This calming zone thus has the effect of reducing the amount of polymer particles carried from the reactor. The calming zone is associated with a considerable capital cost. The process of the present invention has made it possible to omit the calming zone because, firstly, entrained polymer particles can be separated off efficiently in the cyclone and, secondly, the dusts which nevertheless pass through the cyclone can no longer cause problems in the circulating gas system. An advantageous embodiment of the process of the present invention therefore comprises using a reactor without a calming zone.

The use according to the invention of catalyst poisons for reducing deposits in the circulating gas system of gas-phase fluidized-bed polymerization plants makes it possible to increase the running time of such plants significantly without adversely affecting the productivity of the catalyst. Furthermore, the addition of the catalyst poison in the manner specified according to the present invention also reduces deposit formation in the cyclone which likewise increases the running time of the polymerization reactor and improves the product quality. The improved product quality is especially evident in applications in which inhomogeneities as can be formed by uncontrolled polymerization in the circulating gas line or by detachment from deposits have particularly serious effects. It has thus been found that the polymers prepared by the process of the present invention display significantly fewer specks in film applications, i.e. lead to a better film quality.

EXAMPLES

In a gas-phase fluidized-bed production reactor, an MDPE film product (ethylene-1-hexene copolymer, density=0.937 g/cm$^3$, melt flow rate MFR (21.6/190° C.)=12–14 g/10 min) was prepared using a chromium catalyst (silica gel support, 0.2% by weight of chromium) at an output of 9 t/h and a reactor pressure of 21 bar. In examples 1 and 2 according to the present invention, a solution of Atmer 163 (manufacturer: Uniqema, vapor pressure of the compound at 20° C.: 600 Pa) in hexane was metered into the circulating gas line via a nozzle immediately after entry of the reactor gas into the circulating gas line and before entry into the cyclone. The concentration of the Atmer 163 was 0.5% by weight, based on the total mass of the solution. The rate at which the Atmer 163 was metered in was 4.5 g/h. Based on the reactor output, this corresponds to an amount of 0.6 ppm. The productivity of the catalyst does not change as a result of this addition. In comparative examples 3 and 4 no catalyst poison was added. Comparative examples 2 and 4 were carried out in a polymerization plant without a cyclone.

The time for which the polymerization ran without malfunctions due to polymer deposits until shutdown was necessary because of deposits in the circulating gas system or at the bottom of the reactor was measured in each case. Furthermore, the film quality grade was determined. (The film quality grade is a qualitative parameter to indicate the quality of the film; film quality grade 1 indicates very good film quality without specks, film quality grade 6 indicates very poor film quality with numerous specks). The film quality grade at the beginning of each experiment was 2 and deteriorated to the quality grades indicated in the table. The table below shows the results of the experiments:

| Example | Atmer addition | Cyclone | Reactor running time until shutdown [days] | Film quality grade |
|---|---|---|---|---|
| 1 (according to the invention) | + | + | >1100 | 2 (constant) |
| 2 (comparative example) | + | − | 110 | 3–4 (after 45 days) |
| 3 (comparative example) | − | + | 120 | 3–4 (after 45 days) |
| 4 (comparative example) | − | − | 30 | >4 (after 20 days) |

The results show that the introduction according to the present invention of the catalyst poison between reactor and cyclone leads to a far greater than additive lengthening of the reactor running time compared to polymerization processes in which either only a cyclone or only the catalyst poison was used.

Analysis of the impurities in the product indicated that they were ultrahigh molecular weight polyethylene (eta value: 8.5 g/dl) having the same composition as the deposits in the circulating gas system and at the bottom of the reactor occurring in the comparative examples. After processing of the polyethylene to produce films, pipes or blow-molded bodies, specks and/or threads having the same composition as the deposits in the circulating gas system and at the bottom of the reactor are found in the components/films. As a result, the processed products lose their mechanical strength and their optical properties are adversely affected.

We claim:

1. A continuous gas phase polymerization process for preparing ethylene and propene homopolymers and copolymers, in which ethylene, propene or mixtures comprising ethylene and propene and $C_3$–$C_8$-α-monoolefins are polymerized in the polymerization zone of a gas-phase polymerization reactor at from 30 to 125° C. and pressures of from 1 to 100 bar in the gas phase in a bed comprising finely divided polymer in the presence of a catalyst, with the reactor gas being circulated to remove the heat of polymerization and the circulated reactor gas being firstly passed through a cyclone after leaving the reactor, wherein a catalyst poison having a boiling point above the maximum temperature within the circulating gas system is fed into this circulating gas system at a position between the reactor and the cyclone to prevent polymer deposits in the circulating gas system.

2. A continuous gas-phase polymerization process as claimed in claim 1, wherein the polymerization is carried out in a fluidized-bed reactor.

3. A continuous gas-phase polymerization process as claimed in claim 1, wherein the catalyst poison fed in is a compound or a mixture of compounds containing at least one of the functional groups —$NR_2$, —NR—, —OR, —O—, =O, —OS, —S— and =S, where R is hydrogen or an alkyl radical having from 1 to 8 carbon atoms.

4. A continuous gas-phase polymerization process as claimed in claim 1, wherein the catalyst poison has a vapor pressure of less than 10 000 Pa at 20° C.

5. A continuous gas-phase polymerization process as claimed in claim 1, wherein the catalyst poison has a vapor pressure of less than 2000 Pa at 20° C.

6. A continuous gas-phase polymerization process as claimed in claim 1, wherein the catalyst poison is fed into the circulating gas system as a solution in a $C_3$–$C_8$-a-monoolefin.

7. A continuous gas-phase polymerization process as claimed in claim 1, wherein the catalyst poison is fed together with a surface-active compound into the circulating gas system.

8. A continuous gas-phase polymerization process as claimed in claim 1, wherein the mixture of fine dust and catalyst poison which has been separated off in the cyclone is added to the polymerization product.

9. A continuous polymerization process as claimed in claim 1, wherein the polymerization reactor does not have a calming zone.

* * * * *